United States Patent
Wohl et al.

(10) Patent No.: US 10,882,926 B2
(45) Date of Patent: Jan. 5, 2021

(54) METHOD FOR PREPARING A CATALYST COMPOSITION FOR OLIGOMERIZATION OF ETHYLENE AND RESPECTIVE CATALYST COMPOSITION PRE-FORMATION UNIT

(75) Inventors: Anina Wohl, Munich (DE); Wolfgang Muller, Munich (DE); Heinz Bolt, Wolfratshausen (DE); Andreas Meiswinkel, Munich (DE); Uwe Rosenthal, Lambrechtshagen (DE); Bernd Muller, Rostock (DE); Normen Peulecke, Rostock (DE); Christian Thaller, Munich (DE); Marco Harff, Munich (DE); Stephan Peitz, Rostock (DE); Fuad Mosa, Riyadh (SA); Mohammed H. Al-Hazmi, Riyadh (SA); Shahid Azam, Riyadh (SA)

(73) Assignee: SABIC Global Technologies B.V., Bergen op Zoom (NL)

( * ) Notice: Subject to any disclaimer, the term of this patent is extended or adjusted under 35 U.S.C. 154(b) by 45 days.

(21) Appl. No.: 13/985,664

(22) PCT Filed: Jan. 11, 2012

(86) PCT No.: PCT/EP2012/000092
§ 371 (c)(1),
(2), (4) Date: Sep. 17, 2013

(87) PCT Pub. No.: WO2012/110174
PCT Pub. Date: Aug. 23, 2012

(65) Prior Publication Data
US 2014/0005034 A1    Jan. 2, 2014

(30) Foreign Application Priority Data
Feb. 16, 2011 (EP) .................................. 11154663

(51) Int. Cl.
*C08F 4/78* (2006.01)
*B01J 31/00* (2006.01)
(Continued)

(52) U.S. Cl.
CPC ............ *C08F 4/78* (2013.01); *B01J 31/0279* (2013.01); *B01J 31/0282* (2013.01);
(Continued)

(58) Field of Classification Search
None
See application file for complete search history.

(56) References Cited

U.S. PATENT DOCUMENTS

| 4,024,170 A | 5/1977 | Atwood |
| 4,768,384 A | 9/1988 | Flecken et al. |

(Continued)

FOREIGN PATENT DOCUMENTS

| CA | 2249946 A1 | 4/2000 |
| EP | 1136122 A1 | 9/2001 |

(Continued)

OTHER PUBLICATIONS

Broome et al.; "The Solubilities of Dodecylammonium Chloride and its N-Methyl Derivatives in n-Hexane, Benzene and 95.0% Ethanol"; Journal of American Chemical Science; vol. 72, No. 7; 1950; pp. 3257-3260.
(Continued)

*Primary Examiner* — Yun Qian
(74) *Attorney, Agent, or Firm* — Norton Rose Fulbright US LLP

(57) ABSTRACT

The present invention relates to a method for preparing a catalyst composition for the oligomerization of ethylene and a respective catalyst composition pre-formation unit.

17 Claims, 1 Drawing Sheet

(51) Int. Cl.
    B01J 31/02    (2006.01)
    B01J 31/14    (2006.01)
    B01J 31/18    (2006.01)
(52) U.S. Cl.
    CPC ......... *B01J 31/0288* (2013.01); *B01J 31/143* (2013.01); *B01J 31/189* (2013.01); *B01J 2231/20* (2013.01); *B01J 2531/62* (2013.01)

(56) References Cited

U.S. PATENT DOCUMENTS

| | | | |
|---|---|---|---|
| 5,550,306 | A | 8/1996 | Chauvin et al. |
| 5,670,682 | A | 9/1997 | Sangokoya |
| 6,096,680 | A | 8/2000 | Park |
| 6,133,495 | A | 10/2000 | Urata et al. |
| 6,706,657 | B2 * | 3/2004 | Commereuc et al. ........ 502/164 |
| 7,291,575 | B2 | 11/2007 | Shih |
| 8,907,032 | B2 | 12/2014 | Kol et al. |
| 9,018,431 | B2 | 4/2015 | Wohl et al. |
| 2003/0199649 | A1 | 10/2003 | Orbison et al. |
| 2007/0129583 | A1 | 6/2007 | Deboer et al. |
| 2008/0022658 | A1 | 1/2008 | Viola et al. |
| 2010/0267904 | A1 | 10/2010 | Fouarge |
| 2017/0165657 | A1 | 6/2017 | Khurram et al. |

FOREIGN PATENT DOCUMENTS

| | | | |
|---|---|---|---|
| EP | 1578531 | B1 | 8/2010 |
| EP | 2239056 | A1 | 10/2010 |
| JP | H07163885 | A | 6/1995 |
| JP | 2002233764 | A | 8/2002 |
| JP | 2005513115 | A | 5/2005 |
| WO | 8102422 | A1 | 9/1981 |
| WO | 1997033924 | A1 | 9/1997 |
| WO | 2009006979 | A2 | 1/2009 |
| WO | 2009068157 | A1 | 6/2009 |
| WO | 2009121456 | A1 | 10/2009 |
| WO | 2010115520 | A1 | 10/2010 |
| WO | 2012110174 | A1 | 8/2012 |
| WO | 2015114611 | A1 | 8/2015 |
| WO | 2018122703 | A1 | 5/2018 |
| WO | 2018122773 | A1 | 7/2018 |

OTHER PUBLICATIONS

International Search Report; International Application No. PCT/EP2012/000092; International Filing Date: Jan. 11, 2012; dated Mar. 8, 2012; 5 Pages.
Written Opinion of the International Searching Authority; International Application No. PCT/EP2012/000092; International Filing Date: Jan. 11, 2012; dated Mar. 8, 2012; 4 Pages.
Peitz et al.; "A Selective Chromium Catalyst System for the Trimerization of Ethene and Its Coordination Chemistry"; Eur. J. Inorg. Chem.; 2010; pp. 1167-1171.
Sangokoya et al.; "Optically Active Organoaluminum Based Inclusion Compounds: Synthesis and Characterization of (S)-(-)x-[(C6H5)CH(CH3)N(CH3)3][Al2R6I](R=CH3, CH2H5)"; Journal of Inclusion Phenomena; vol. 6; 1988; pp. 263-266.
European Search Report for Application No. 11154663; Date of Completion of the Search: May 19, 2011, 3 pages.
International Search Report; International Application No. PCT/IB2017/058301; International Filing Date; Dec. 21, 2017; dated Mar. 15, 2018, 5 pages.
International Search Report; International Application No. PCT/IB2017/058473; International Filing Date Dec. 28, 2017; dated Apr. 24, 2018, 5 pages.
Written Opinion of the International Searching Authority; International Application No. PCT/IB2017/058301; International Filing Date Dec. 21, 2017; dated Mar. 15, 2018, 5 pages.
Written Opinion of the International Searching Authority; International Application No. PCT/IB2017/058473; International Filing Date Dec. 28, 2017; dated Apr. 24, 2018, 6 pages.
Aluri et al.; "Coordination chemistry of new selective ethylene trimerisation ligand Ph2PN(iPr)P(Ph)NH(R) (R=iPr, Et) and tests in catalysis"; Dalton Trans., 2010, vol. 39, pp. 7911-7920.
Aluri et al.; "Synthesis, Coordination Chemistry, and Catalysis of the First 1,2-Bis(diphenylphosphino)-1,2-diphenylhydrazine, Ph2PN(Ph)N(Ph)PPh2"; Organometallics 2010, vol. 29, pp. 226-231.
Atwood et al.; "Solid state structure and solution behavior of compounds of the type M[A12(CH3)6X]"; J. Organomental. Chem., 1972, vol. 42, pp. C77-C79.
Barden et al.; "A NMR Method to Probe the Nature of Liquid Clathrates"; Journal of Inclusion Phenomena 1986, vol. 4, pp. 429-431.
Gaudet et al.; "Ternary Hydrogen Halide/Base/Benzene Mixtures: A New Generation of Liquid Clathrates"; Journal of Inclusion Phenomena 1988, vol. 6, pp. 425-428.
Holbrey et al.; "Liquid clathrate formation in ionic liquid-aromatic mixtures"; Chem. Commun. 2003, pp. 476-477.
Hrncir et al.; "Indium-Based Liquid Clathrates III. Inclusion Compounds Derived from [Bu4N][InCl3X] Salts and Their Suitability as a Catalysis Medium"; Journal of Inclusion Phenomena 1988, vol. 6, pp. 233-236.
Jerry L. Atwood; "New Inclusion Methods for Separations Problems" Separation Science and Technology 1984-85, vol. 19, pp. 751-759.
Martell et al.; "Synthesis and Structure of Mixed Chloride-Tetrachloroaluminate Salts"; J. Chem. Soc. Dalton Trans. 1991, pp. 1495-1498.
Muller et al.; "A Kinetic Model for Selective Ethene Trimerization to 1-Hexene by a Novel Chromium Catalyst System"; ChemCatChem 2010, vol. 2, pp. 1130-1142.
Peitz et al.; "Activation and Deactivation by Temperature: Behavior of Ph2PN(iPr)P(Ph)N(iPr)H in the Presence of Alkylaluminurn Compounds Relevant to Catalytic Selective Ethene Trimerization"; Chem. Eur. J. 2010, vol. 16, pp. 12127-12132.
Peitz et al.; "An Alternative Mechanistic Concept for Homogeneous Selective Ethylene Oligomerization of Chromium-Based Catalysts: Binuclear Metallacycles as a Reason for 1-Octene Selectivity?"; Chem. Eur. J. 2010, vol. 16, pp. 7670-7676.
Peitz et al.; "Metalation and Transmetalation Studies on Ph2PN(iPr)P(Ph)N(iPr)H for Selective Ethene Trimerization to 1-Hexene"; Organometallics 2010, vol. 29, pp. 5263-5268.
Peitz et al.; Abstracts of Papers, 240th ACS National Meeting, Boston, MA, United States, Aug. 22-26, 2010 (2010), INOR-655.
Peulecke et al.; "Immobilized Chromium Catalyst System for Selective Ethene Trimerization to 1-Hexene with a PNPNH Ligand"; ChemCatChem 2010, vol. 2, pp. 1079-1081.
Wohl et al.; "Influence of Process Parameters on the Reaction Kinetics of the Chromium-Catalyzed Trimerization of Ethylene"; Chem. Eur. J. 2010, vol. 16, pp. 7833-7842.
Fengkai et al.; "Chemical Production Technology"; Tianjin University Press; Aug. 2008; p. 80.
Ning; "Advanced Inorganic Synthesis"; East China University of Science and Technology Press; Sep. 2007; p. 28.
Japanese Patent No. 2002233764; Date of Publication: Aug. 20, 2002; Abstract Only, 1 page.
Japanese Patent No. 2005513115; Date of Publication: May 12, 2005; Abstract Only, 2 pages.
Japanese Patent No. H07163885; Date of Publication: Jun. 27, 1995; Abstract Only; 2 pages.
International Search Report; International Application No. PCT/IB2015/050826; dated May 15, 2015, 5 pages.
Written Opinion of the International Search Report; International Application No. PCT/IB2015/050826; dated May 15, 2015, 6 pages.
Luo Hongwei, Top Ten Chemical Engineering Chemical Industry Code of Practice and National Occupation Standards; China Knowledge Press, 2006, Machine Translation, 5 pages.

* cited by examiner

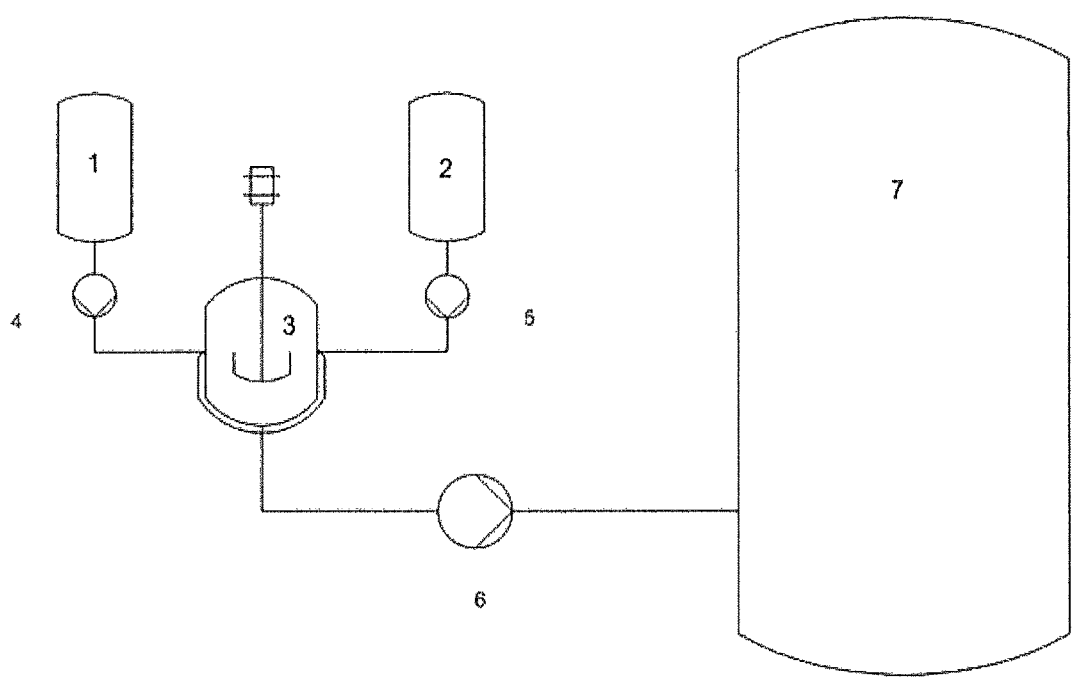

METHOD FOR PREPARING A CATALYST COMPOSITION FOR OLIGOMERIZATION OF ETHYLENE AND RESPECTIVE CATALYST COMPOSITION PRE-FORMATION UNIT

CROSS REFERENCE TO RELATED APPLICATION

This application is a 371 of International Application No. PCT/EP2012/000092 filed Jan. 11, 2012, which claims priority to European Application No. 11154663.6, filed Feb. 16, 2011, both of which are hereby incorporated by reference in its entirety.

The present invention relates to a method for preparing a catalyst composition for the oligomerization of ethylene and a respective catalyst composition pre-formation unit.

Catalyst systems and processes for the oligomerization of ethylene, in particular for the selective trimerization of ethylene to 1-hexene and/or the tetramerization to 1-octene, have been described in a large body of scientific publications and patent documents.

For example, in EP 1 578 531 B1 a process for tetramerization of ethylene to 1-octene is disclosed, utilizing a catalyst system comprising a chromium source, a co-catalyst or activator (typically an organoaluminum compound) and a heteroatomic ligand that features, at least in some embodiments, typically a PNP-backbone.

WO 2009/068157 A1 reveals how selectivity control between tri- and tetramerization of ethylene can be used in an oligomerization process, aimed at the production of 1-hexene or 1-octene, respectively. This process is based on results from mechanistic research strongly suggesting the importance of binuclear chromium complexes/chromium metallacycles as origin of such selectivity behavior.

WO 2009/006979 A2 describes a process and corresponding catalyst system for the di-, tri- and/or tetramerization of ethylene, based on a chromium complex with a heteroatomic ligand, typically featuring a PNPNH-backbone and activated by an organoaluminum compound such as, e.g., trialkylaluminum or methylaluminoxane. Among other possible embodiments of this invention, $CrCl_3(thf)_3$ (thf=tetrahydrofurane) is preferentially used as chromium source.

WO 2009/121456 A1 teaches how such a catalyst system can successfully be immobilized on, for instance, a cross-linked polystyrene matrix, effectively yielding a highly stable and selective heterogeneous version of the catalyst system disclosed in WO 2009/006979 A2.

EP 2 239 056 A1 describes a catalyst composition and process for oligomerization, in particular for the selective trimerization of ethylene to 1-hexene, using a modification of the catalyst system disclosed in WO 2009/006979 A2. While also relying on ligand types featuring the PNPNH-backbone, these modified systems show distinct advantages over the original catalyst compositions in terms of stability, activity, selectivity and the allowable window of operability concerning process parameters in a technical environment.

According to EP 2 239 056 A1, halogen-containing modifiers different from Cr-compounds are used, in conjunction with, for example, $Cr(acac)_3$ (acac=acetylacetonate), the PNPNH-ligand and triethylaluminum as activator. Typical modifiers are, e.g., tetraarylphosphonium or tetraalkylammonium halogenides, preferentially the chlorides. In contrast to catalyst systems using $CrCl_3(thf)_3$ as chromium source, these modified systems allow for a free and independent adjustment of the chromium/halogen/aluminum ratio. This is a very advantageous strategy, since basic mechanistic investigations have shown that the halogen is an indispensable constituent of the catalytically active species, thus influencing the overall catalytic performance.

However, the catalyst compositions known in the art, especially from EP 2 239 056 A1, comprising a chromium compound, a ligand, a modifier and an activator, show several disadvantages:

Some of the catalysts's components are only poorly soluble in the, preferentially, aromatic solvents of the process. This is especially true for the modifier which, however, is an indispensable ingredient of the system.

All catalyst constituents need to be meticulously metered into the reactor so as to adjust very precisely the productivity and to avoid thermal runaways. This requirement prohibits the use of slurry systems or any system for handling solids. Instead, the catalyst components should be introduced into the reactor by means of dosing pumps.

For high productivities and high selectivities, the catalyst composition needs to be precisely defined in terms of total chromium concentration and particularly regarding the molar ratios of ligand/chromium, aluminum/chromium and modifier/chromium.

Preparation of the entire homogeneous catalyst, comprising all of the four components, is not feasible in a technical environment, due to the degradation of the catalyst on a timescale of equal or greater than approximately one day. This degradation results in deteriorating activity and increased wax/polymer formation. The catalyst components are mixed and then immediately transferred to the oligomerization reactor to avoid decomposition of the catalyst system, leading to deteriorating activities and side product formation.

It is therefore an object of the present invention to provide a method for preparing a catalyst composition for the oligomerization of ethylene and a respective catalyst composition pre-formation unit which overcome the drawbacks of the prior art, wherein the catalyst composition can especially be easily and in a reliable manner metered into an oligomerization reactor.

The first object is achieved by a method for preparing a catalyst composition for the oligomerization of ethylene comprising the steps:
a) preparing in a solvent a first solution by mixing of a co-catalyst and a modifier, wherein the co-catalyst is selected from trialkyl aluminum, alkyl aluminum sesquichloride, dialkyl aluminum chloride, alkyl aluminum dichloride, wherein alkyl is preferably methyl, ethyl, isopropyl or isobutyl, methylaluminoxane (MAO) or mixtures thereof, and wherein the modifier is selected from ammonium or phosphonium salts of the type $[H_4E]X$, $[H_3ER]X$, $[H_2ER_2]X$, $[HER_3]X$ or $[ER_4]X$ or HX or RX with E=N or P, X=Cl, Br or I and R=alkyl, cycloalkyl, acyl, aryl, alkenyl, alkynyl or the corresponding bridging di-, tri- or multiunits, or ammonium salts based on cyclic amines;
b) adding a chromium compound and a ligand to the first solution obtained in step a) to obtain a second solution; and
c) optionally mixing the second solution obtained in step b) for 10 seconds to 5 hours, preferably 0.5 hours to 2.5 hours.

Preferably, the chromium compound is selected from organic or inorganic salts, coordination complexes and organometallic complexes of Cr(II) or Cr(III), preferably $CrCl_3$ $(THF)_3$, Cr(III)acetylacetonate, Cr(III)octanoate, chromium hexacarbonyl, Cr(III)-2-ethylhexanoate, benzene(tricarbonyl)-chromium or Cr(III)chloride.

More preferably, the ligand has the general structure $R_1R_2P\text{—}N(R_3)\text{—}P(R_4)\text{—}N(R_5)\text{—}H$, wherein $R_1, R_2, R_3, R_4$ and $R_5$ are independently selected from halogen, amino, trimethylsilyl, $C_1\text{-}C_{10}$-alkyl, substituted $C_1\text{-}C_{10}$-alkyl, aryl and substituted aryl. A preferred lig- and is for example $Ph_2PN(iPr)P(Ph)N(iPr)H$.

It is also preferred that the chromium compound and the ligand are added to the first solution obtained in step a) simultaneously, preferably dissolved in a second solvent.

In a preferred embodiment, the first and/or second solvent is an aromatic or aliphatic solvent or mixtures thereof, preferably toluene, benzene, ethylbenzene, cumenene, xylenes, mesitylene, hexane, octane, cyclohexane, olefins, such as hexene, heptene, octene, or ethers, such as diethylether or tetrahydrofurane, more preferably an aromatic solvent, most preferably toluene.

In a most preferred embodiment, the co-catalyst is trialkyl aluminum ($AlR'_3$ with R'=alkyl or aryl), and the modifier is an ammonium or phosphonium salt of the type $[ER_4]X$, resulting after mixing in a reaction product having the formula $[ER_4][Al_2R'_6X]*(solvent)_n$ with $0 \leq n \leq 100$, preferably $1 \leq n \leq 20$, according to reaction scheme:

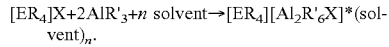
$[ER_4]X + 2AlR'_3 + n\text{ solvent} \rightarrow [ER_4][Al_2R'_6X]*(solvent)_n$.

It is preferred that the molar ligand/Cr ratio is from 0.5 to 50, preferably from 0.8 to 2.0.

More preferred, the molar Al/Cr ratio is from 1.0 to 1,000, preferably from 10 to 100.

Most preferably, the molar modifier/Cr ratio is from 0.1 to 100, preferably from 1 to 20.

According to the invention is also a catalyst composition pre-formation unit for preparing a catalyst composition for the oligomerization of ethylene, the catalyst composition comprising a chromium compound, a ligand, a modifier and a co-catalyst, wherein the unit comprises a first vessel containing a solution of co-catalyst and modifier, a second vessel containing chromium compound and ligand, the first and second vessel being connected via lines, optionally each having dosing pumps, to a mixing unit, the mixing unit being connected via a line, optionally having a dosing pump, to an oligomerization reactor.

It is evident that for the chromium compound, the ligand, the modifier and the co-catalyst the compounds as disclosed above have to be selected.

Finally it is preferred that the mixing unit is a vessel comprising stirring means.

In a most preferred embodiment, the modifier utilized for preparing the catalyst composition is not a chromium compound, especially no halide-containing chromium compound.

Surprisingly, it was found that an inventive method and pre-formation unit can be provided resulting in the preparation of an optimized homogeneous catalyst composition that shows maximum stability, selectivity and activity. Also, this homogeneous catalyst composition is easy to handle from a chemical engineering perspective, meaning that it is sufficiently soluble in the process solvent (typically toluene) so that it can be readily metered into the oligomerization reactor, preferentially by dosing pumps. A solution of the catalyst composition shows a sufficient shelf life.

It was surprisingly found that simple mixing of the four catalyst components, feasible as it might appear on laboratory scale, is not suitable for a technical scale process. The modifiers as, for instance, tetraphenyl phosphonium chloride or tetraalkyl ammonium chloride, are only poorly soluble especially in aromatic solvents. In a technical process, this would imply the need for slurry-handling systems to achieve reasonable reproducibility concerning catalyst dosing. Clearly, a very precise catalyst dosing system is indispensible for the process, because exothermicity/heat balance and conversion/selectivity are strong functions of catalyst concentration and, thus, need to be balanced in a very delicate manner.

Preparing a catalyst solution from all four components in one storage vessel and dosing the solution into the oligomerization reactor is no technical option either, because the catalyst solution is not entirely stable on the intrinsic timescale dictated by the storage vessel/dosing system. This is because, like in many homogeneous catalyst systems, the active species is being formed only in the presence of the reactant, i.e. the ethylene. In the absence of ethylene, the catalytically active species begins to decompose over time. This leads to a loss of activity and selectivity or in the worst case to unwanted and uncontrollable side-reactions like polymerization. The shelf life of the complete pre-mixed catalyst in toluene of prior art catalysts is only few hours. Consequently, the early preparation of the entire catalyst system would not be suitable for a technical process.

The present invention alleviates the problems of the prior art considerably by first preparing stock solutions, i.e. a first stock solution containing co-catalyst and modifier, and at least one further stock solution comprising chromium compound and/or ligand, which turn out to be absolutely stable on the time scale of interest in a technical process.

In other words, the inventive method especially targets chemical engineering aspects, namely a method for preparation of a respective catalyst composition in a technologically feasible way is provided, i.e. ensuring sufficient catalyst stability before injection into the reaction zone, ensuring solubility of the catalyst components, avoiding solids/slurry handling, enabling the use of simple dosing pumps for precise dosing.

According to the invention, it was found that ligand, chromium compound and modifier do not react at all with each other in the absence of the co-catalyst. However, the ligand and the co-catalyst react in a complex way over several reaction steps involving adduct-formation, alumination/deprotonation, followed by rearrangement by transamidation, see. U. Rosenthal et al., European Journal of Inorganic Chemistry (2010), (8), 1167-1171.

Further, the chromium compound and the co-catalyst do react, leading to alkylation and/or reduction of Cr(III) to Cr(II) or Cr(I).

Interestingly, it was found that the modifier and the co-catalyst react in a more complicated way then immediately evident. In many cases, depending on the exact nature of the chosen modifier, they react to form "a liquid clathrate" that preferably incorporates a welldefined number of solvent molecules:

$[NR_4]Cl + 2AlR_3 + n\text{Solvent} \rightarrow [NR_4][Al_2R_6Cl]*(Solvent)_n$ (1)

Using, for example, tetraphenylphosphonium chloride as modifier and triethylaluminum as co-catalyst in a toluene solution, one arrives at a liquid clathrate that can be regarded as an ionic liquid that contains exactly 13 toluene molecules:

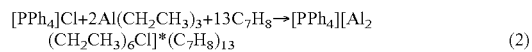
$[PPh_4]Cl + 2Al(CH_2CH_3)_3 + 13C_7H_8 \rightarrow [PPh_4][Al_2(CH_2CH_3)_6Cl]*(C_7H_8)_{13}$ (2)

With respect to the oligomerization catalyst composition described above, liquid clathrates of the type $[NR_4]$

[Al$_2$R$_6$Cl]*(Solvent)$_n$ or [PR$_4$][Al$_2$R$_6$Cl]*(Solvent)$_n$ or the like turned out to be surprisingly useful.

To fully appreciate this finding, one first has to understand that this class of catalyst systems requires the presence of a halogen, in particular as a halide such as iodide, bromide or chloride. While the presence of iodides or bromides lead to high 1-hexene selectivities at moderate catalytic activities, the use of chlorides is advantageous due to the high productivities while maintaining the high product purities.

It was surprisingly found that the reaction product of the modifier and co-catalyst is soluble in the solvent and can thus be easily pumped by means of a dosing pump. Surprisingly, a relatively high concentration of this reaction product can be achieved, making this a suitable dosing solution for technical applications.

Modifiers, such as tetraalkylammonium chlorides or tetraphenylphosphonium chloride, are soluble in toluene only in a very low concentration (less than approximately 0.1 wt. %). For example, it was published that the solubility of the single component dodecyl trimethylammonium chloride in benzene is about 0.06 wt % at 84° C., see F. K. Broome et al., JACS 1950, 72, 7, pages 3257-3260. Consequently, a highly concentrated stock solution of solely dodecyltrimethylammoniumchloride cannot be applied, otherwise a slurry had to be handled.

It was shown that according to the method of claim 1, relatively highly concentrated stock solutions (containing all four components necessary) of more than 5 wt. % can be prepared.

The two stock solutions containing (1) the reaction product from the modifier and the co-catalyst and (2) the physical solution of the chromium compound and the ligand can, preferably, be prepared batch-wise and stored for rather long periods of time before they are combined to form the final catalyst composition solution.

Additional features and advantages of the subject-matter of the present invention can be taken from the following detailed description of a preferred embodiment in conjunction with an attached drawing, the FIGURE showing a schematic diagram of a catalyst pre-formation and dosing unit for preparing the inventive catalyst composition.

According to the present invention, the catalyst composition is preferably prepared in a catalyst pre-formation unit with an adequate residence time.

As shown in the attached FIGURE, the reaction product (first solution) of modifier and co-catalyst may be prepared and afterwards stored in a vessel 1, whereas chromium compound and ligand (third solution) can be stored in a vessel 2. It is evident that chromium compound and ligand can be also stored separately in individual vessels. Vessel 1 and Vessel 2 are connected with a mixing unit, preferably a vessel comprising stirring means, via lines. The lines may preferably have a dosing pump and/or a valve for metering the respective first and second solutions, as appropriate, into the mixing unit 3. The mixing unit 3 can either be operated batch-wise or continuously. As an alternative, a product-flow reactor can also be used as mixing unit. The mixing unit 3 is connected with an oligomerization reactor 7 via a line which also preferably has a dosing pump 6 and/or a valve for precisely metering the mixture of first and second solutions into the oligomerization reactor 7 to then start an oligomerization reaction.

Most preferably, the residence time in the catalyst pre-formation vessel 3 is adjusted to a range of 10 seconds to 5 hours, preferably 0.5 hours to 2.5 hours, before the catalyst composition is transferred to an oligomerization reactor 7, preferably utilizing a dosing pump 6.

The reaction product in a storage vessel 1 may be a solution of an ionic liquid or salt, wherein the molar amount of solvent is no longer a fixed integer number but varies freely, i.e. n=0.

In storage vessel 1 and 2, the contents are preferably held at temperatures between 0° C. and 50° C., preferably between 15° C. and 25° C., under inert atmosphere, for example N$_2$ or Ar.

The temperature in the catalyst pre-formation vessel 3 is preferably from 0° C. to 80° C., more preferably 15° C.-25° C., and the pressure in the pre-formation vessel 3 headspace is 0.5-80 bar, preferably 0.8-2.5 bar of an inert gas, such as N$_2$ or Ar.

The concentrations of both solutions and the dosing rate, controlled optionally by dosing pumps 4, 5 and 6, are carefully chosen so as to adjust the total catalyst concentration in the oligomerization reactor 7 and the ligand/Cr molar ratio, the Al/Cr molar ratio and the modifier Cr molar ratio.

Preferably, the total concentration of the catalyst composition in the oligomerization reactor 7, expressed as concentration of Cr, is 0.001 to 10.0 mmol/l, preferably 0.1 to 1.0 mmol/l.

Exactly defined and constant composition of the active catalyst composition in the mixing unit, i.e. catalyst pre-formation vessel 3, is extremely important in order to ensure constant catalyst dosing to the reactor 7. This can only be achieved if the compositions of the media in the vessels 1 and 2 are also defined and constant. Normally, the feeds to the vessels 1 and 2 are batchwise introduced from external storage tanks. Based on that, the required defined and constant compositions in these vessels can only be accomplished if their filling is performed offline and monitored, before their outlet streams are fed into the mixing unit 3.

As a consequence, in a preferred embodiment the catalyst pre-formation and dosing unit includes the following equipment:

Storage vessel 1 in which the reaction between the modifier and the co-catalyst is performed. This vessel will be installed as 2×100% units. i.e. vessel 1 A and vessel 1B.

Storage vessel 2 which contains the chromium precursor/PNPNH-ligand solution. Also this vessel will be installed as 2×100% units, i.e. vessel 2 A and vessel 2 B.

Mixing unit 3.

Dosing pumps 4, 5 and 6.

During normal plant operation e.g. the vessels 1 A and 2 A are in operation, i.e. the catalyst components from these vessels are routed continuously, defined and monitored by ratio control to the mixing unit 3 with constant concentrations. By means of the dosing pump 5 the active catalyst composition solution is introduced into the reactor 7, which then receives acive catalyst composition at constant concentration and constant flow rate.

During the described period the vessels 1 B and 2 B are offline, i.e. not connected to the mixing unit 3.

Modifier and co-catalyst, respectively chromium precursor/PNPNH-ligand will be fed into the vessels 1 B and 2 B, until in both vessels exactly the required concentrations of the components will be achieved. Concentrations will be monitored during the filling procedure in order to achieve and confirm the required qualities. After a certain period, feeding to the mixing unit 3 will be switched from the storage vessels 1A and 2A to the storage vessels 1B and 2B.

Whenever slight losses in catalyst activity are acceptable, the mixing unit 3 can be simplified to a static mixer, mixing the streams of the two precursor-solutions from the storage vessels 1 and 2 at ambient temperature, optionally followed by a pre-determined length of tubing so as to achieve a mean residence time greater than or equal to 1 sec before entering the oligomerization reactor 7. In this case the dosing pump 6 is obsolete and the dosing pumps 4 and 5 need to be capable to deliver a total pressure that is greater than the process pressure in the trimerization reactor, which is typically 1.5 to 150 bar, preferentially 25 to 65 bar.

Likewise, in an even more simplified embodiment of the invention, the two catalyst-precursor streams from vessel 1 and 2 can be mixed by combining the streams in a Tfitting, followed by a length of tubing to assure a minimum residence time of approx. 1 sec.

Stability of Stock Solutions

Two stock solutions were prepared as follows:

1. A $Cr(acac)_3$/PNPNH-solution (containing approx. 5 wt.-% $Cr(acac)_3$ and a Ligand/Cr-ratio of 1.2 mol/mol) was prepared from 0.435 g $Cr(acac)_3$ and 0.603 g $Ph_2PN(iPr)P(Ph)N(iPr)H$ in 10 ml anhydrous toluene: the $Cr(acac)_3$ and the crystalline PNPNH-ligand was weighed in. The dry toluene was injected under vigorous agitation using a magnetic bar stirrer. The solid components dissolved very quickly in toluene and formed a deep-red solution. The solution was stored at ambient temperature (20° C.) under a nitrogen atmosphere in a glove box.

2. A solution of the reaction product (analogous to reaction equations 1 and 2) from dodecyltrimethylammonium chloride and triethylaluminum (TEA) was prepared by reacting 0.635 g of the tetraalkylammonium chloride with 3.8 ml of a 1.9 mol/l TEA—solution in toluene in a total volume of 30 anhydrous toluene of 10 ml: The tetraalkylammonium chloride was suspended in toluene. After the addition of the TEA—solution, a clear colorless solution was obtained. The dissolved ionic liquid was stored at ambient temperature under nitrogen atmosphere in a glove box.

For the catalyst preparation, the required amount of each solution so as to achieve a Cr-concentration of 0.3 mmol/l was dissolved under stirring in 100 ml anhydrous toluene and transferred immediately to a stirred pressure reactor, where the reaction was started by pressurizing with ethylene (T=50° C., p=30 bar, residence time=1 h, $V_{toluene}$=100 ml, [Cr]=0.3 mmol/l, [Ligand]/[Cr]=1.2, [Al]/[Cr]=24 (molar units)).

The storage time of the two stock solutions was varied and the effect of the storage time on catalytic performance was investigated.

The figures for activity (relative to initial activity at a storage time of 0 days), selectivity and 1-hexene purity, i.e. the percentage 1-C6 in the total C6-fraction, as a function of storage time are given in Table 1 below. The absolute initial activity using the fresh solutions was determined as 49.5±2.5 kg product per g catalyst and hour in several experimental runs.

It becomes obvious that the activity and the selectivity for the fresh solutions are lower than for the aged solutions. This can be traced back to the fact that the stock solutions, especially the tetraalkylammonium chloride/TEA, had not enough time to complete the reaction to the ionic liquid-type species $[NR_4][Al_2R_6Cl]*(Solvent)_n$. However, one can conclude that both stock solutions can be stored for long times without significant loss in catalytic performance since neither the activity nor the selectivity shows any deterioration between 0 and 26 days of storage. Furthermore, it was observed that the kinetics of the ethylene uptake was identical for all aged solutions within experimental error limits.

Also, it should be noted that analogous experiments using, e.g. tetraphenylphosphonium chloride instead of the tetraalkylammonium chlorides as modifier, although resulting in different overall activities, showed the same behavior regarding aging effects.

TABLE 1

Influence of the age of two stock solutions ($Cr(acac)_3$/PNPNH, modifier/TEA in toluene) on activity, C6-selectivity and 1-hexene in total C6.
Experimental conditions: T = 50° C., p = 30 bar, residence time = 1 h, $V_{toluene}$ = 100 ml, [Cr] = 0.3 mmol/l, [Ligand]/[Cr] = 1.2, [Al]/[Cr] = 24 (molar units); The absolute initial activity is 49.5 ± 2.5 kg/($g_{Cr}$ · h).

| Exp. No. | Storage Time [days] | Relative activity [%] | Total C6 [wt.-%] | 1-C6 in C6-fraction [wt.-%] |
|---|---|---|---|---|
| 1 | 0 | 100.0 | 90.9 | 99.0 |
| 2 | 5 | 139.1 | 93.4 | 99.0 |
| 3 | 26 | 122.2 | 94.5 | 99.1 |

Kinetics of the Catalyst Formation

The previous experimental series shows that the two stock solutions ($1^{st}$ chromium source/PNPNH-ligand and $2^{nd}$ $[NR_4][Al_2R_6Cl]*(Solvent)_n$ or $[PPh_4][Al_2R_6Cl]*(Solvent)_n$) can separately be prepared and stored for longer times. However, to develop a suitable dosing concept for the homogeneous ethylene trimerization catalyst system, the kinetics of the catalyst formation is of great importance.

Therefore, a test series with varying residence times in the mixing unit (catalyst pre-formation unit) was conducted. The catalyst was prepared using the two stock solutions as described in the previous example. The required amount of both solutions so as to result in a 0.3 mmol/l Cr-concentration was dissolved in 100 ml toluene and stirred for the pre-determined time under argon atmosphere at room temperature (20° C.). Subsequently, the catalyst solution was transferred to the autoclave and the reaction was started by pressurizing with ethylene (T=50° C., p=30 bar, residence time=1 h, $V_{toluence}$=100 ml, [Cr]=0.3 mmol/1, [Ligand]/[Cr]=1.2, [Al]/[Cr]=24 (molar units)).

Table 2 shows the activity, C6-selectivity and the 1-hexene purity as a function of the catalyst pre-formation residence time.

TABLE 2

Activity, C6-selectivity and 1-hexene in total C6 depending on the catalyst pre-formation residence time.
Experimental conditions: T = 50° C., p = 30 bar, residence time = 1 h, $V_{toluene}$ = 100 ml, [Cr] = 0.3 mmol/l, [Ligand]/[Cr] = 1.2, [Al]/[Cr] = 24 (molar units).

| Exp. No. | Pre-formation residence time [h] | Relative activity [%] | Total C6 [wt.-%] | 1-C6 in C6-fraction [wt.-%] |
|---|---|---|---|---|
| 1 | 0 | 100.0 | 94.6 | 99.1 |
| 2 | 0.5 | 117.1 | 94.5 | 99.1 |
| 3 | 1.0 | 126.4 | 96.1 | 99.1 |
| 4 | 2.0 | 129.4 | 94.3 | 99.0 |
| 5 | 4.0 | 106.8 | 94.9 | 99.1 |
| 6 | 24.0 | 55.4 | 94.8 | 99.1 |

The average activity shows a flat maximum at a catalyst formation time of about 2 h. Consequently, short pre-formation residence times are insufficient for the complete formation of the active catalyst species. There are still uncoordinated chromium species, which are responsible for the reduced activity. After the optimum pre-formation time, the catalyst deteriorates again with increasing residence time, which results in a drop in activity. After a pre-formation period of 24 h, the catalyst shows only about half of its original activity. Fortunately, the selectivity and the C6-purity are not affected by the catalyst pre-formation time.

The features disclosed in the foregoing description, in the claims and in the drawing may, both separately and in any combination thereof, be material for realizing the invention in diverse forms thereof.

The invention claimed is:

1. A method for preparing a catalyst composition for the oligomerization of ethylene comprising the steps:
   a) reacting in a first solvent, a co-catalyst and a modifier, wherein the co-catalyst is triethylaluminum, and wherein the modifier is tetraphenylphosphonium chloride to form a reaction product;
   b) adding a chromium compound and a ligand to the first solution of the reaction product obtained in step a) to obtain a second solution; and
   c) mixing the second solution obtained in step b) for 10 seconds to 5 hours by pressurizing with ethylene at a pressure of 30 bar and at a temperature of 50° C.;
   wherein the first solvent is toluene;
   wherein the second solvent is an aromatic or aliphatic solvent or mixtures thereof;
   wherein the chromium compound is selected from organic or inorganic salts, coordination complexes and organometallic complexes of Cr(II) or Cr(III);
   wherein the molar ligand/Cr ratio is from 0.5 to 50; and
   wherein the ligand has the general structure $R_1R_2P$—$N(R_3)$—$P(R_4)$—$N(R_5)$—H, wherein $R_1$, $R_2$, $R_3$, $R_4$ and $R_5$ are independently selected from halogen, amino, trimethylsilyl, $C_1$-$C_{10}$-alkyl, substituted $C_1$-$C_{10}$ alkyl, aryl and substituted aryl;
wherein the reaction product is a liquid clathrate having the formula

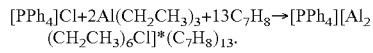

$[PPh_4]Cl+2Al(CH_2CH_3)_3+13C_7H_8 \rightarrow [PPh_4][Al_2(CH_2CH_3)_6Cl]*(C_7H_8)_{13}$.

2. The method according to claim 1, wherein the chromium compound is an inorganic chromium salt.

3. The method according to claim 2, wherein the chromium compound is selected from $CrC_3(THF)_3$, Cr(III)acetylacetonate, Cr(III)octanoate, chromium hexacarbonyl, Cr(III)-2-ethylhexanoate, benzene(tricarbonyl)-chromium or Cr(III)chloride.

4. The method according to claim 1, wherein the ligand has the general structure $R_1R_2P$—$N(R_3)$—$P(R_4)$—$N(R_5)$—H, wherein $R_1$, $R_2$, $R_3$, $R_4$ and $R_5$ are independently selected from $C_1$-$C_{10}$-alkyl.

5. The method according to claim 1, wherein wherein $R_1$ and $R_5$ are independently selected from $C_1$-$C_{10\text{-}alkyl}$.

6. The method according to claim 5, wherein the chromium compound and the ligand are added to the first solution obtained in step a) simultaneously, dissolved in a second solvent.

7. The method according to claim 5, wherein the ligand has the general structure $R_1R_2P$—$N(R_3)$—$P(R_4)$—$N(R_5)$—H, wherein $R_4$ is $C_1$-$C_{10}$-alkyl.

8. The method according to claim 1, wherein the second solvent is toluene.

9. The method according to claim 1, wherein the ligand has the general structure $R_1R_2P$—$N(R_3)$—$P(R_4)$—$N(R_5)$—H, wherein $R_1$ is $C_1$-$C_{10}$-alkyl.

10. The method according to claim 1, wherein $R_1$ and $R_2$ are the.

11. The method according to claim 1, wherein the molar Al/Cr ratio is from 1.0 to 1,000.

12. The method according to claim 1, wherein the molar modifier/Cr ratio is from 0.1 to 100.

13. The method according to claim 1, wherein the ligand has the general structure $R_1R_2P$—$N(R_3)$—$P(R_4)$—$N(R_5)$—H, wherein $R_2$ is $C_1$-$C_{10}$-alkyl.

14. The method according to claim 1, wherein the ligand has the general structure $R_1R_2P$—$N(R_3)$—$P(R_4)$—$N(R_5)$—H, wherein $R_3$ is $C_1$-$C_{10}$-alky.

15. The method according to claim 1, wherein the ligand has the general structure $R_1R_2P$—$N(R_3)$—$P(R_4)$—$N(R_5)$—H, wherein $R_5$ is $C_1$-$C_{10}$-alkyl.

16. The method according to claim 1, wherein the second solution obtained in step b) is mixed for 0.5 hours to 2.5 hours.

17. The method according to claim 1, wherein the ligand has the general structure $R_1R_2P$—$N(R_3)$—$P(R_4)$—$N(R_5)$-H wherein $R_3$ is C1-C10-alkyl.

* * * * *